(12) United States Patent
Griffin, Jr. et al.

(10) Patent No.: US 6,434,450 B1
(45) Date of Patent: Aug. 13, 2002

(54) IN-VEHICLE INTEGRATED INFORMATION SYSTEM

(75) Inventors: James C. Griffin, Jr., Iowa City; Ronald E. Stahlberg, Coralville; J. Jay Lash, Vinton; Gregory A. Dils, Iowa City, all of IA (US)

(73) Assignee: Diversified Software Industries, Inc., Coralville, IA (US)

( * ) Notice: Subject to any disclaimer, the term of this patent is extended or adjusted under 35 U.S.C. 154(b) by 0 days.

(21) Appl. No.: 09/175,834

(22) Filed: Oct. 19, 1998

(51) Int. Cl.$^7$ ................................................ G06F 7/00
(52) U.S. Cl. ............................................. 701/1; 701/36
(58) Field of Search ................................ 701/1, 29, 30, 701/31, 35, 36; 340/901, 905, 425.5, 500, 825.36; 345/112, 113, 115, 116, 117, 156, 335

(56) References Cited

U.S. PATENT DOCUMENTS 4,787,040 A * 11/1988 Ames et al.
5,880,710 A * 3/1999 Jaberi et al.
5,978,720 A * 11/1999 Hieronymus et al.
5,982,368 A * 11/1999 Toffolo et al.

OTHER PUBLICATIONS

Stuckey, S., "Toward the Highway Super–information", *The Engineer*, London, England, 22–23, (Sep. 1995).
"Interactive Car Navigation System", *Electronics Now*, Philips Car Systems, p. 3, (Mar. 1998).
"PCs in Vehicles",*Automotive Engineering*, 72, (Apr. 1997).
Buchholz, K., "Electroluminescent Displays Permit Custom Gauges", Automotive Engineering, p. 55–56, (Dec. 1997).
Demmler, A., "Rockwell's PathMaster System",*Automotive Engineering*, p. 65–68, (May 1996).
Holt, D., "Every Car a Web Site!",*Automotive Engineering*, p. 92, (May 1996).
Jost, K., "Buick Provides Car for Smart Highway Project", *Automotive Engineering*, p. 100, (May 1997).
Jost, K., "Instrumentation from Mannesmann VDO", *Automotive Engineering International*, p. 59–60, (May 1998).
Jost, K., "The car as a Mobile–Media Platform",*Automotive Engineering International*, p. 49–53, (May 1998).
Kimberley, W., et al., "Focus on Telemetry", *Automotive Engineer*, p. 42–54, (Feb. 1998).
Martin, N., "Intel's Powerful PC Puts Pizzazz In New vehicles", *AI*, 183, 185 (Feb. 1998).
Martin, N., "Internet On Wheels", *AI*, P. 51, p. 69, (May 1998).
McEntee, M., "High Speed In–Vehicle Networking for Navigation Systems", *Automotive Engineering*, p. 34–37, (May 1996).
Ponticel, P., "Siemens Developing 3–in–1 Driver–Aid Device", *Automotive Engineering*, p. 103, (Jul. 1997).
Utamaphethai, N., et al., "Dicaf: A Distributed Architecture for Intelligent Transportation", *Research Feature—1998 IEEE*, p. 78–84, (Mar. 1998).
Vollmer, R., et al., "Intelligent Navigation Systems", *Automotive Engineering*, p. 71–75, (May 1996).
Yamaguchi, J., "Honda In–Car Navigation System for the U.S.", *Automotive Engineering*, p. 82–84, (Jun. 1998).

\* cited by examiner

*Primary Examiner*—William A. Cuchlinski, Jr.
*Assistant Examiner*—Edward Pipala
(74) *Attorney, Agent, or Firm*—Rader, Fishman & Grauer, PLLC (57) ABSTRACT

An in-vehicle information system having a programmable multi-purpose display is described. The system receives and manages information from a variety of sources including both in-vehicle and off-vehicle applications. The system dynamically displays real-time information to a driver within the standard line-of-sight of the driver. The information is selectively displayed to the driver based on predefined trigging conditions. The system integrates disparate technologies a manner that does not degrade driving performance and safety.

33 Claims, 8 Drawing Sheets

IN-VEHICLE INTEGRATED INFORMATION SYSTEM

FIELD OF THE INVENTION

The present invention relates generally to intelligent vehicle systems and more specifically to an information system for a vehicle that integrates information from multiple sources on a single in-vehicle display.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1998 Diversified Software Industries, Inc., All Rights Reserved.

BACKGROUND OF THE INVENTION

Motor vehicles are undergoing dramatic changes in their capabilities due to the use of computer-based technologies. The early use of computer-based technologies in motor vehicles included technologies designed to enhance vehicle capability and performance. Examples of these technologies included electronic fuel injection to control engine performance, antilock braking systems to help a driver retain control on slippery roads, and cruise control to relieve a driver's tedium during long stretches of driving.

The more recent use of computer-based technologies is aimed at enhancing the capabilities of the driver, including driver safety, performance, and convenience. Such computer-based technologies that are currently available include electronic steering and suspension, keyless and remote entry systems, devices that remember a driver's seating and mirror positions, and radio settings for example. New technologies are also available for navigation based on dead-reckoning technology and global positioning systems.

Previously, new computer-based technologies for vehicles were generally available to consumers as optional equipment by new vehicle manufacturers or as specialty components available from after-market suppliers. Such new technologies have yet to be fully integrated to create a single system for the driver to use. The large number of these new and uncoordinated technologies used in motor vehicles can distract and overwhelm drivers with competing messages and demands. Often, a driver may be required to respond to incoming information, while the driver is performing complex driving tasks.

Drivers have more information available now than they have traditionally had in the past. With the increasing amount of information becoming available to a driver, there is a need to effectively manage information made available to the driver. Without a system to manage various new in-vehicle technologies, driving performance and safety is degraded. With the amount of electronics and information that is now becoming available in vehicles, there is a need to integrate, condense and present all of this information in a coherent and cohesive manner to drivers.

Therefore, there is a need for a single system that integrates disparate in-vehicle technologies in a system that is easy to use and does not degrade driving performance and safety.

SUMMARY OF THE INVENTION

The present invention relates an information system for a vehicle which integrates information from multiple sources on a single programmable in-vehicle display. The display may be presented to an operator or a passenger in the vehicle, depending on the intended use of the information presented on the display.

One aspect of the invention is an information system for use in a vehicle. The information system integrates information from multiple sources and selectively presents the information to an operator on a single display located in the line of sight of the operator of the vehicle. The information presented to the operator at a particular time depends on predefined priorities.

Another aspect of the invention is a method of presenting information from multiple applications on a dynamic in-vehicle display. According to the method, data is received from one of the applications. The data is prioritized to determine if a new screen is to be presented on the display. A current screen presented on the in-vehicle display is updated when at least one triggering condition indicates to do so.

A further aspect of the invention is a vehicle having an in-vehicle information system for receiving information from a variety of sources and selectively displaying the information to a driver based on predetermined priorities. The information is displayed to the driver on a centrally located display. The system also includes an in-vehicle browser for presenting information to the driver and receiving requests from the driver.

An additional aspect of the invention is an intelligent vehicle system having an in-vehicle information system for receiving information from a variety of sources and selectively displaying the information to a driver based on predetermined priorities. The intelligent vehicle system also has a server for providing information to the in-vehicle information system.

A still further aspect of the invention is a computer readable medium having instructions for causing a computer to perform a method of presenting information from multiple applications on a dynamic in-vehicle display.

Still other and further embodiments, aspects and advantages of the invention will become apparent by reference to the drawings and by reading the following detailed description.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention. It is to be understood that other embodiments may be utilized and that structural, logical and electrical changes may be made without departing from the scope of the present inventions. The following detailed description is, therefore, not to be taken in a limiting sense, and the scope of the present inventions is defined only by the appended claims.

An In-Vehicle Information System comprises a programmable multi-purpose display for use in a vehicle. The system acquires, processes and displays information visually to drivers and/or passengers. The system provides a wide array of real-time information all within the standard line-of-sight of the driver and/or passengers. This In-Vehicle Information System may provide the user with not only information about vehicle performance and operating conditions via an advanced instrument cluster, but also with navigation and road information such as traffic congestion and construction information as well as information from a variety of other sources. The In-Vehicle Information System selectively and dynamically displays information based on predefined triggering conditions. In the following description, the term operator and driver are used interchangeably.

The detailed description is divided into four sections. In the first section, the operating environment in conjunction with which embodiments of the invention can be practiced is described. In the second section, an overview of the system architecture of one embodiment of the invention is presented. In the third section, methods of using example embodiments of the invention are provided. In the fourth section, a particular implementation of the invention is described.

Figure 1:
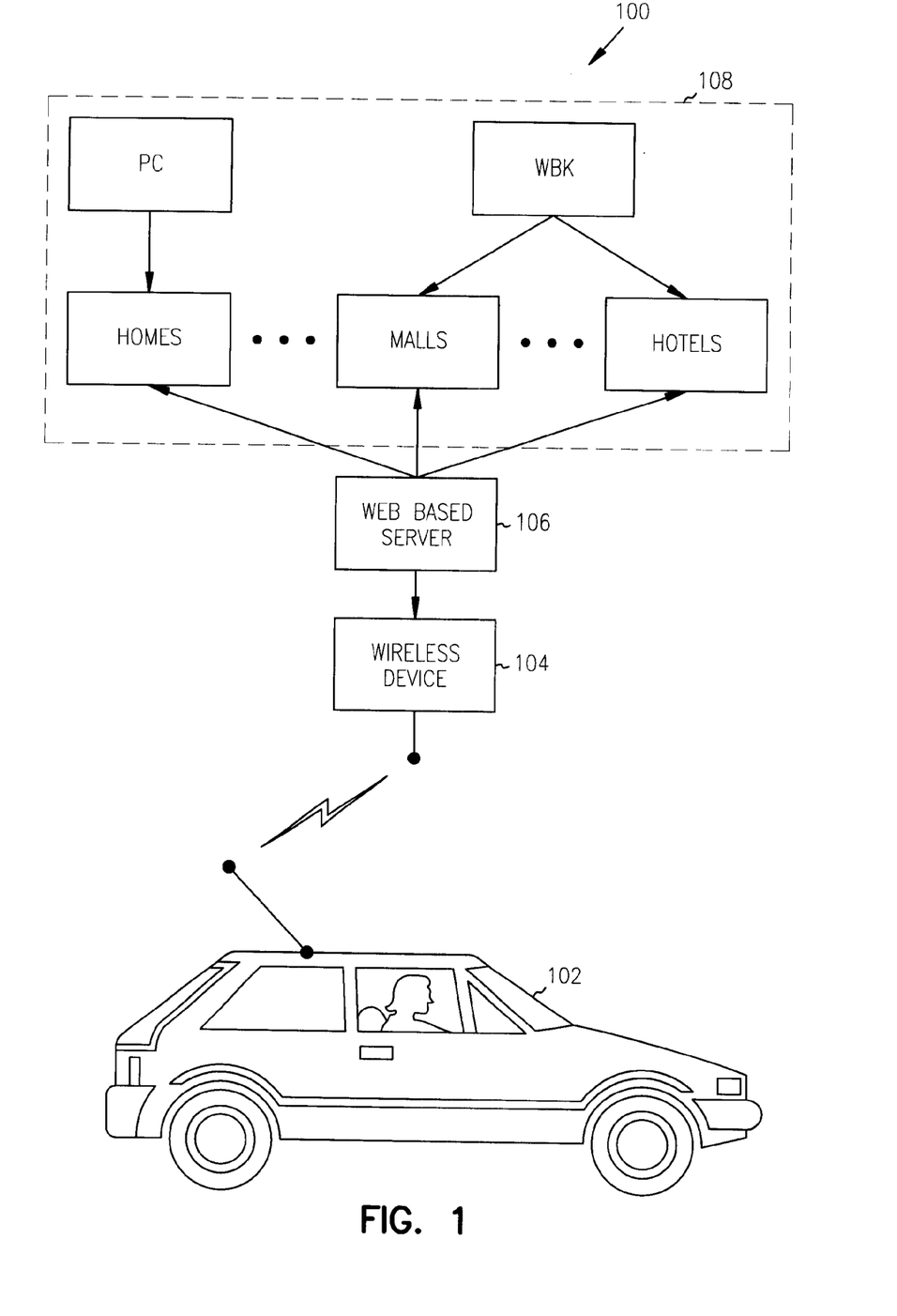
FIG. 1 is a diagram of one embodiment of an intelligent vehicle system in conjunction with which embodiments of the present invention may be implemented

Operating Environment. This section provides an overview of the operating environment together with which embodiments of the invention can be practiced. FIG. 1 is a diagram of an intelligent vehicle system in conjunction with which embodiments of the invention may be implemented. The intelligent vehicle system 100 comprises a vehicle 102, a wireless communication device 104, and one or more servers such as web-based information server 106.

The vehicle 102 includes an In-Vehicle Information System of the present invention that is further described below. The In-Vehicle Information System comprises a programmable multi-purpose display that prioritizes information and is capable of integrating information from multiple sources, on a single display device. Information is presented on a display device located in the vehicle 102. Information can be received by the In-Vehicle Information System from several sources including from a user interface, from in-vehicle sources and from off-vehicle sources. Off-vehicle sources are accessed with wireless communication device 104.

The wireless communication device 104 sends requests to and receives data from the web-based information server 106. Wireless communication device 104 includes any device capable of transmitting data over a wireless network. Example wireless networks include cellular phone networks, satellite-based networks, and microwave-based networks. Those skilled in the art will recognize, however, that other comparable wireless networks may be employed without diverting from the scope of the present invention.

In one embodiment, the wireless communication device 104 operates with an Internet service provider. When the In-Vehicle Information System receives a request for information from a user such as a driver or a passenger, the system establishes a network connection via a wireless communication device 104. A connection is made to an Internet Service Provider (ISP). Depending on the services available, the Internet Service Provider can be the user's hometown ISP, an ISP in the current area code with guest access, or a toll-free ISP with personal or guest access.

The web-based information server 106 comprises a dynamically updated, web-based information system that provides a source of data for the In-Vehicle Information System. In one embodiment, the server 106 hosts a particular geographic region's or a particular city's information on businesses, government, mapping, construction, community events, up-to-the-minute traffic, or weather, for example. Server 106 allow users to obtain information from any city or region. Server 106 is a single-source, multi-site information center for the In-Vehicle Information System. In one embodiment, the server 106 also provides web access from a personal computer (PC) and from a Web-Based Kiosk (WBK) as shown in box 108. This allows travelers to check traffic congestion or alternate routes while approaching a larger city or allows users to check such conditions before leaving their home or office for example.

In one embodiment, the server 106 receives compressed data requests via a standard CGI-based interface over the existing Internet infrastructure. The request is then decompressed by the server 106, and the data keywords are processed. After searching a database on the server for the requested information, a file or data package is created in a format readable by the In-Vehicle Information System in the vehicle. This file or data package is then compressed and returned to the vehicle via the wireless communications link.

In an alternate embodiment, the In-Vehicle Information System runs autonomously with-out any connection to server 106 or any other information source outside the vehicle 102. Depending on the implementation this embodiment may reduce the amount of information available to the In-Vehicle Information System.

Figure 2A:
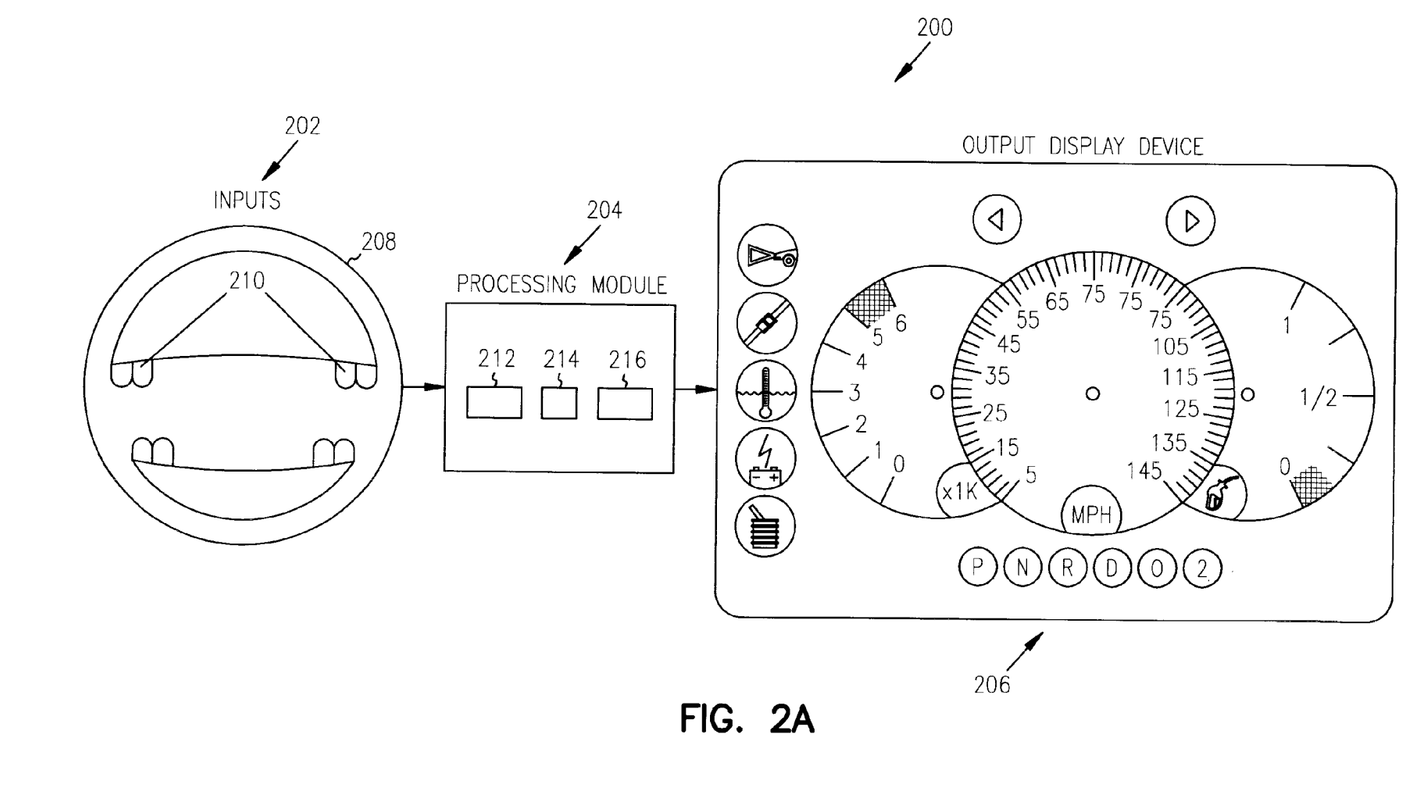
FIG. 2A is a block diagram of one embodiment of an In-Vehicle Information System of the present invention for use in a vehicle such as the vehicle shown in FIG. 1.

FIG. 2A is a diagram of one embodiment of an In-Vehicle Information System for use in a vehicle such as the vehicle 102 shown in FIG. 1. The In-Vehicle Information System 200 comprises a plurality of inputs 202, a processing module 204 and an output display device 206. The inputs 202 comprise information received from a variety of sources. The processing module 204 prioritizes the information received and manages the information presented to the driver. The information presented to the driver is displayed on a programmable display device 206 located within the driver's line-of-sight in the vehicle 102 of FIG. 1.

Inputs 202 comprise any information available to a driver or a passenger of the vehicle. The inputs 202 are received from a number of sources. Inputs 202 are received from in-vehicle systems via an in-vehicle network or directly by the system. Examples of data from in-vehicle systems include fuel level, odometer reading, speedometer reading, temperature, fluid levels and the like. Additional inputs 202 are received from the driver via a user interface in the vehicle. In the example embodiment shown in FIG. 2A, inputs from a driver are received from buttons or switches 210 located on a steering wheel 208 of the vehicle. In a further embodiment, steering wheel controls are multi-functional and allow a driver to toggle between desired menus. Alternate devices for a driver to select or input information include but are not limited to a mouse, a knob, a touch pad, a touch screen display and voice recognition technology. Further inputs 202 are received from off-vehicle systems. An example of an off-vehicle system is the server 106 shown in FIG. 1 that provides information requested by the user from the Internet such as stock market tracking, suggested routes from a given source to a given destination on a road map, up-to-date weather, traffic and road construction information for example. Alternate embodiments in which inputs are received from additional or differing in-vehicle systems, off-vehicle systems, and user interfaces will be readily apparent to one skilled in the art and are contemplated as within the scope of the invention.

The processing module 204 comprises program modules that perform particular functions. Generally, program modules include routines, programs, objects, components, data structures, etc., that perform particular functions or implement particular abstract data types. Processing module 204 comprises computer-readable instructions stored on a computer-readable media 212 such as random-access memory (RAM), read-only memory (ROM), or storage devices. Example storage devices include a hard disk drive, a floppy disk drive, a compact disc read-only memory (CD ROM), an optical disk drive, a tape cartridge drive and the like. The computer-readable media provide nonvolatile storage of computer-readable instructions, data structures, program modules and other data. Processing module 204 manages the information available to the driver. Processing module 204 prioritizes information and integrates information from multiple data sources on a display. The program modules are executed on a processor 214 or computer 216 mounted in the vehicle.

The output device 206 is a multi-purpose display located within the user's line of sight in the vehicle to display information. In one embodiment, the display device 206 is centered in a dashboard of the vehicle in place of the instrument cluster. Display device 206 is a programmable display screen such as an LCD or FED display that allows the display of information for viewing by a driver. In an alternate embodiment, one or more additional display devices 205 are provided for passengers. The additional display devices 206 provide additional information including satellite TV, plug-in support for video games such as NINTENDO or SEGA GENESIS, and keyboard connectivity for example.

A user interface displayed on display device 206 comprises an advanced instrument cluster or user-customized screen layouts. The content of the screens can be reconfigured to display information from multiple sources. For example, one or more instrument gauges, cruise control, audio controls, climate controls, car phone controls, navigation information and the like can be displayed individually or interchangably combined and displayed on display device 206. The content of the screens can also be reconfigured to reflect individual user preferences. For example, a user can customize the colors, fonts, language, content and arrangement of a screen displayed on display device 206.

In one embodiment, the user interface comprises an in-vehicle browser to receive information from off-vehicle systems. The in-vehicle browser is similar to commonly available web browsers, but its functionality and interface are streamlined for use in a vehicle environment. For example, in one embodiment the in-vehicle browser prompts the user for the locale, service desired, and other information (such as service costs or availability). If used in conjunction with global positioning system (GPS) technology, the locale can be suggested by determining available services within a fixed radius of the vehicle's position. Data requests are received by the user interface several ways, including keypad, keyboard, or even voice recognition technology. The user interface supports multiple languages, screen layouts and content. This allows drivers to customize their preferences on the In-Vehicle Information System.

Optionally, the In-Vehicle Information System comprises additional hardware for other third party services installed in the car such as speech recognition hardware for selecting items from a user interface displayed on the output display device 206.

Figure 2B:
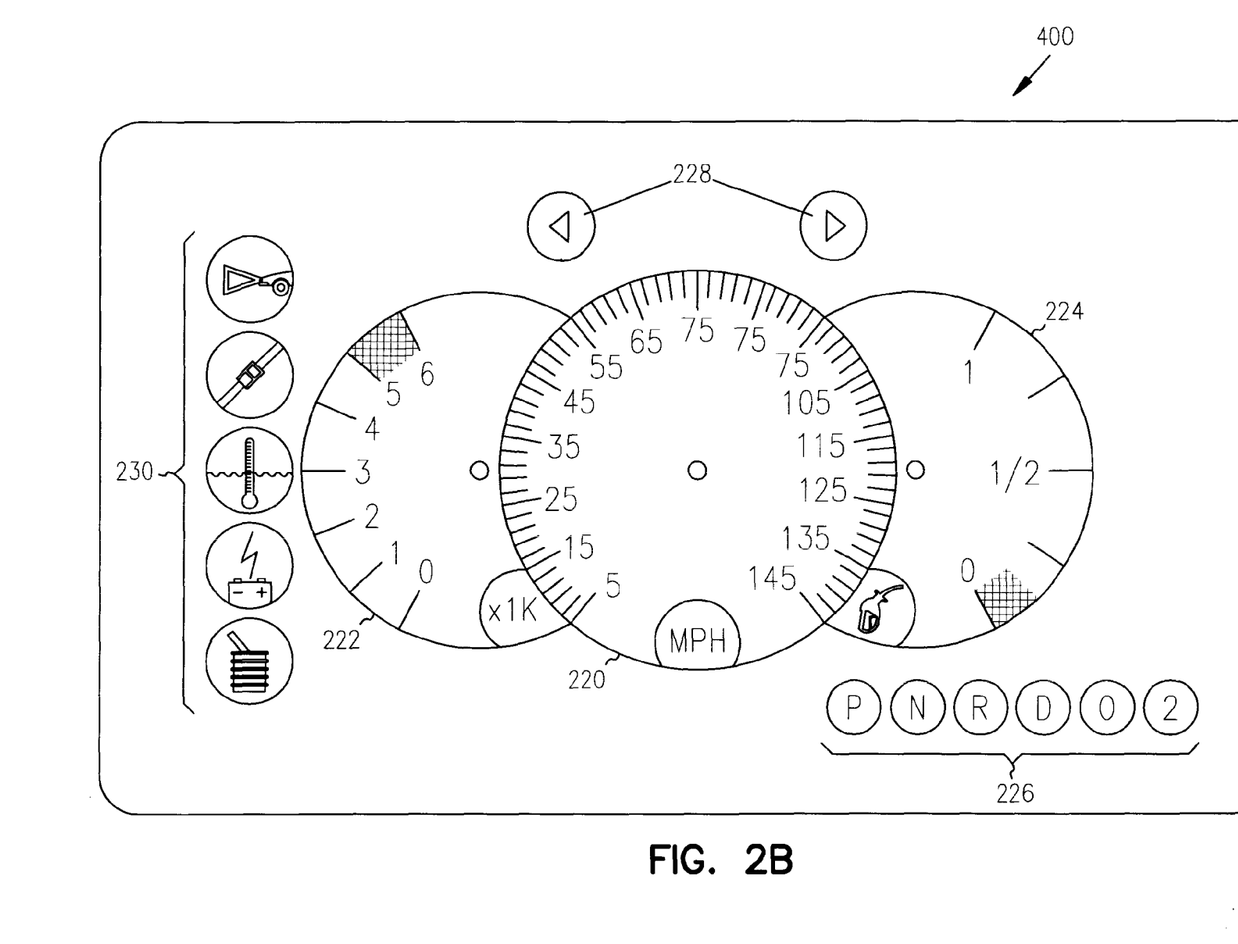
FIGS. 2B, 2C, and 2D are example embodiments of user-customized screens for displaying information on an output display device such as the output display device shown in FIG. 2A.
Figure 2C:
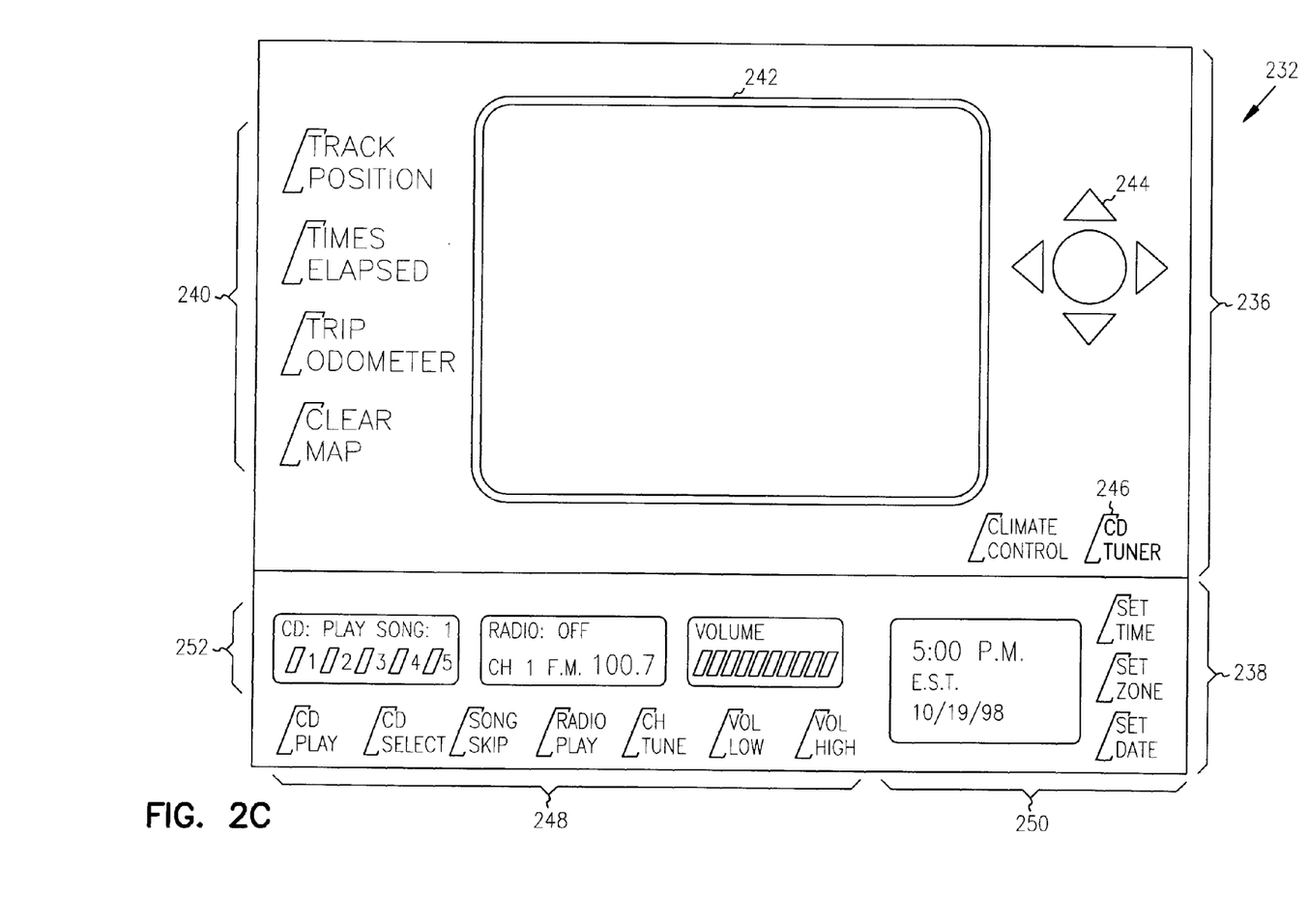
Figure 2D:
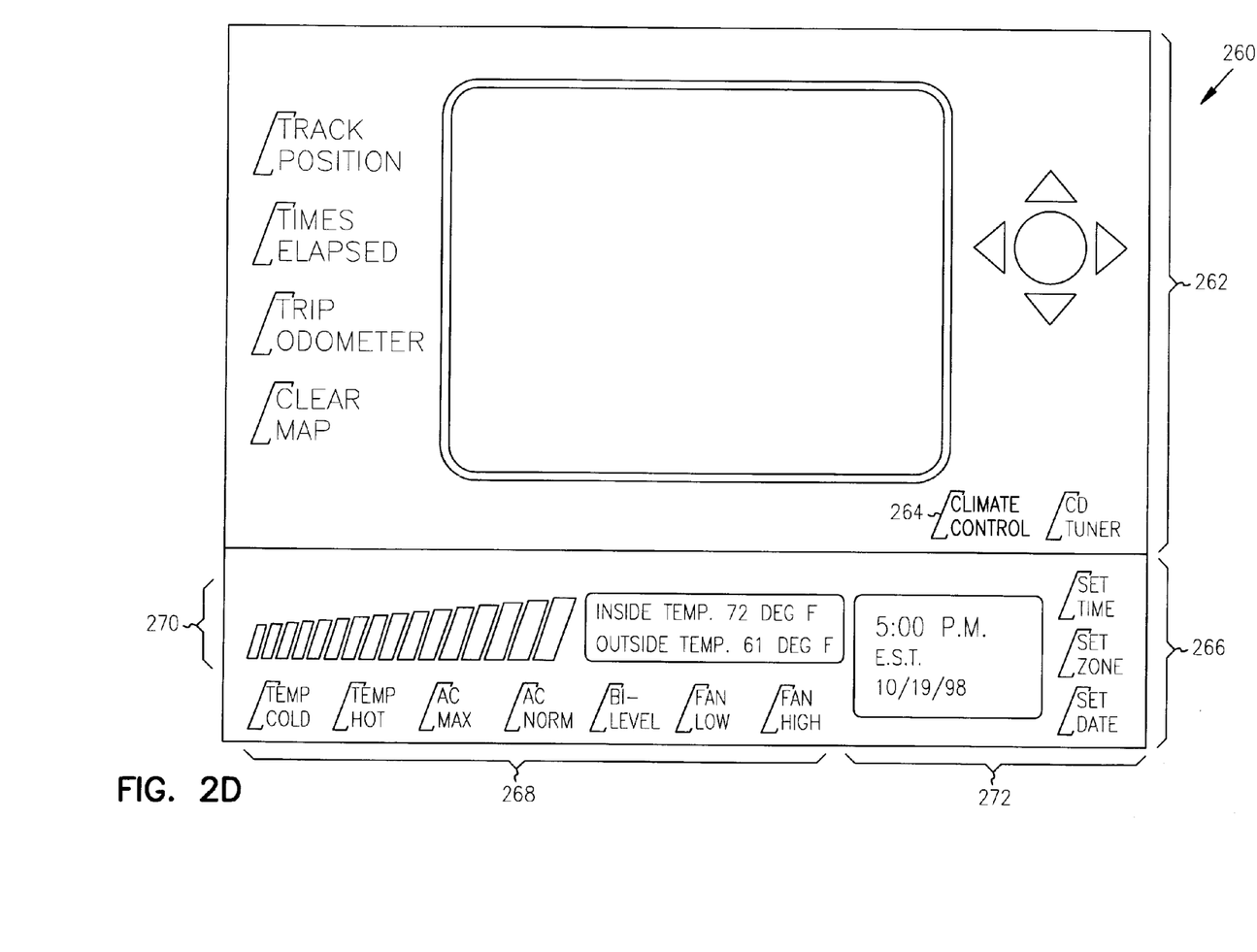

FIGS. 2B, 2C, and 2D are example embodiments of user-customized screens for displaying information on an output display device such as the output display device 206 shown in FIG. 2A. FIG. 2B is an instrument cluster screen 218. In one embodiment, the instrument cluster screen graphically displays a speedometer 220, a tachometer 222, a fuel gauge 224, gear indicators 226, turn signals 228, and additional indicator lights 230. In one embodiment, if one of the indicator lights 230 is illuminated, the In-Vehicle Information System switches to a maintenance mode allowing a user to obtain additional vehicle operating information and to check the current status of various vehicle components. In an alternate embodiment, illumination of one of the indicator lights 230 triggers the In-Vehicle Information System to add navigation information and directions to the nearest service station on the current display.

FIG. 2C is an example of a custom screen 234 for displaying information from both a navigation system and an audio system. In one embodiment, an upper region 236 displays navigation information and a lower region 238 displays audio information and data/time information. The navigation information comprises a navigation system control menu 240, an area for displaying a map 242, and controls for manipulating the map 244. The audio information is displayed on the lower region 238 of the screen by selecting the "CD/Tuner" option 246. The audio information comprises audio controls 248 and current setting displays 252 for the CD player, the radio and the volume. The lower region 238 also displays date/time information and controls 250.

FIG. 2D is another example of a custom screen 260 for displaying information from both a navigation system and a climate control system. In one embodiment, the upper region 262 displays navigation information as described above with respect to FIG. 2C. The climate control information is displayed on the lower region 266 of the screen by selecting the "Climate Control" option 264. The climate control information comprises controls 268 and current settings displays 270. The lower region 266 also displays date/time information and controls 272.

The screens shown in FIGS. 2B, 2C, and 2D are for illustrative purposes only. Alternate embodiments having additional or differing combinations of information from a variety of sources displayed on a single screen will be readily apparent to one of skill in the art and are contemplated as within the scope of the invention.

System Architecture. A system architecture for an example embodiment of the In-Vehicle Information System of FIG. 2A is described by reference to FIG. 3. The system architecture is a framework within which the services and functions of individual applications can be integrated and presented to the driver with a single driver-vehicle interface.

Figure 3:
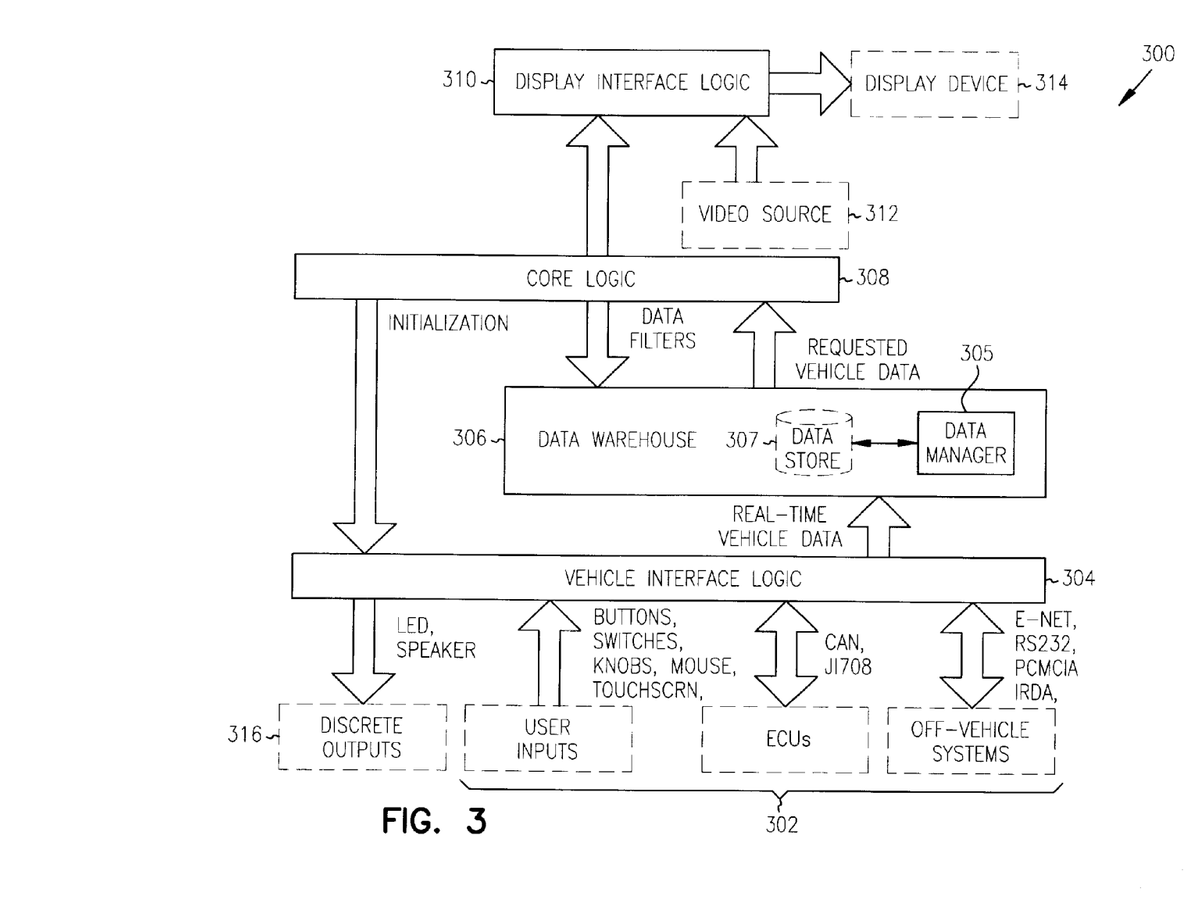
FIG. 3 is a block diagram of a system architecture for one embodiment of the In-Vehicle Information System of FIG. 2A.

The system architecture 300 for the In-Vehicle Information System comprises a plurality of inputs 302, vehicle interface logic 304, a data warehouse 306, core logic 308, display interface logic 310, a video source 312, a display device 314, and one or more discrete outputs 316.

The plurality of inputs 302 to the In-Vehicle Information System are received from a variety of sources. Vehicle inputs are received from engine control units (ECUs). To receive inputs from ECUs, the In-Vehicle Information System uses a network protocol that meets the existing requirements of in-vehicle control systems. Two examples of network protocols designed specifically for in-vehicle networks are CAN (Controller Area Network) and SAE J-1708. Other inputs 302 are received from a driver or a user. The driver or user selects or inputs information with buttons, switches, a mouse, a knob, a touch pad, a touch screen display, or voice recognition technology for example. Off-vehicle system inputs are received by Ethernet, RS-232, PCMCIA (Personal Computer Memory Card International Association) or IrDA (Infrared Data Association) connections for example. Alternate embodiments in which inputs are received using additional or differing protocols and connections for in-vehicle systems, off-vehicle systems, and user interfaces will be readily apparent to one skilled in the art and are contemplated as within the scope of the invention.

The vehicle interface logic 304 receives data used by the In-Vehicle Information System. Vehicle interface logic 304 provides connectivity with the various on- and off-vehicle systems and user interface devices. The vehicle interface logic 304 allows for a "plug-and-play" system because it relies on SAE (Society of Automotive Engineers) standardized vehicle network interface protocols and connectivity. This permits independent third-party vendors to design devices, tools and other in-vehicle products that can use the In-Vehicle Information System framework for graphics and display support. The vehicle interface logic 304 passes the data to the data warehouse 306.

The data warehouse 306 provides storage for persistent system data, filtering for real-time vehicle data, and an interface to both the vehicle interface logic 304 and the core logic 308. The data warehouse 306 acts as a buffer between two free-running real-time modules—the vehicle interface logic 304 and the core logic 308. The vehicle interface logic 304 places data into the data warehouse 306 as the data is received by the vehicle interface logic 304. The core logic 308 takes data out of the data warehouse 306 as the display device 314 requires the data.

In one embodiment, the data warehouse 306 comprises a data manager 305 and a data store 307 as well as an interface between the data manager 305 and the data store 307. The data manager 305 receives data from the vehicle interface logic 304, standardizes the data, filters the data and stores the data in the data store 307 for use by the rest of the system 300. Standardizing the data consists of converting a vehicle's data identifier to an internal identifier and converting the data into a format that is compatible with the data store 307. To facilitate standardizing, all data received by the data manager 305 contains the vehicle's data, the vehicle's identifier for the data and which interface the data came from. After standardizing, filtering is applied based on a filter list retrieved from the data store 307. If the filter list contains an entry for the internal identifier of the received data, the received data is passed on to the data store 307. If no entry exists in the filter list, the received data will be discarded. Discarding such data reduces the amount of data maintained by the data store 307 that will not be used by the system 300.

The data store 307 is a storage facility that allows dynamic allocation of data. The data store 307 provides an interface for adding and retrieving data. When data is added to the data store 307, the data store 307 checks for an existing entry that has the same internal identifier. If an existing entry is found, the new data replaces the existing entry. If no existing entry is found, a new entry is created in the data store 307. Retrieving data from the data store 307 does not delete, nullify or invalidate the entry for that identifier. In one embodiment, each entry in the data store 307 contains a time stamp to determine the age of the data. The time stamp is the time that the current data value was entered into the data store 307. In another embodiment, a filter interface between the data store 307 and the core logic 308 allows the core logic 308 to define a list of vehicle information that the core logic 308 will use in the system's current configuration. The corresponding filter list is maintained by the data store 307. In an alternate embodiment, multiple filter lists are maintained by the data store 307 to reduce re-configuration overhead when the core logic 308 changes operating modes.

The core logic 308 drives the In-Vehicle Information System. Core logic 308 makes decisions based on input received from the vehicle interface logic 304, and displays and sends output based on those decisions. In one embodiment, the core logic 308 contains instructions, data and objects for drawing any screen used by the In-Vehicle Information System. The core logic 308 also includes trigger conditions or predefined rules of priority used to determine when to switch to another screen. Switching to another screen may involve drawing an entirely different screen or changing the composition and/or configuration of the current screen. An example embodiment of the core logic is further described below in the "Diversified Software, Inc. Implementation" section.

The display interface logic 310 controls the display device 314 in response to instructions from the core logic. The display device 314 presents information, including graphics specific to a particular product or information source, to the driver or passengers through a single display. Such product-specific graphics include graphics from third-party vendors who have designed their products to interact with the display device 314. In one embodiment, the display device 314 is a flat panel display such as a liquid crystal display (LCD) or a Field Emitting Display (FED). Those skilled in the art will recognize, however, that other comparable display devices may be employed without diverting from the scope of the present invention.

The video source 312 includes close cameras, DVDs (digital video disc), and VCRs.

The discrete outputs 316 include LEDs (light emitting diodes), speakers, switches, HVAC (Heating, Ventilation, and Air Conditioning) controls, radio controls, and interfaces to other peripheral systems in the vehicle.

Figure 4:
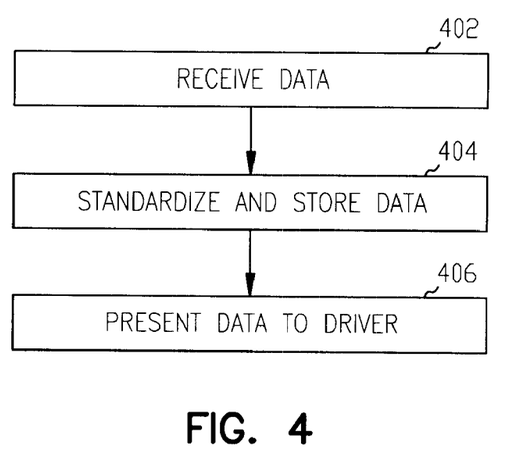
FIG. 4 is a flow chart of a process to manage information available to a driver according to one embodiment of the In-Vehicle Information System of FIG. 2A.
Figure 5:
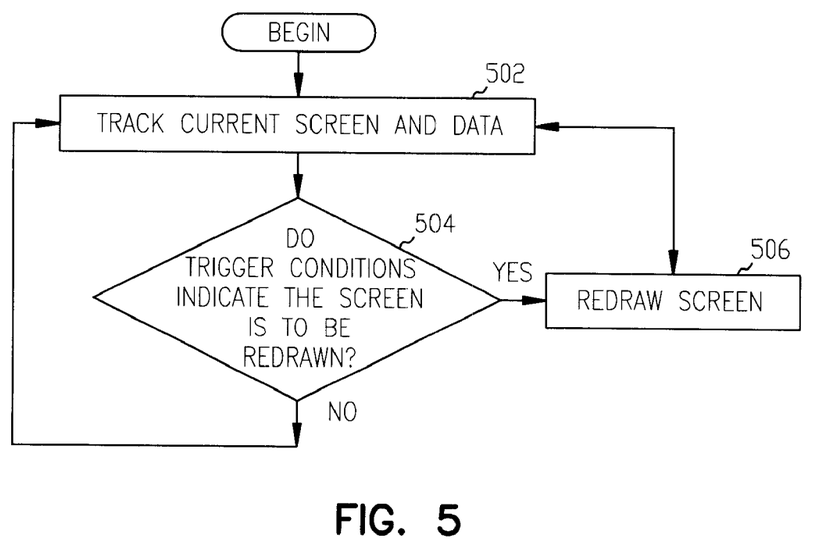
FIG. 5 is a flow chart of a process of presenting information to a driver according to one embodiment of the In-Vehicle Information System of FIG. 2A.

Methods of the Invention. In this section, the particular methods performed by a processor, such as processor 214 of FIG. 2A, in an exemplary embodiment are described by reference to flowcharts. The methods to be performed constitute computer programs made up of computer-executable instructions. The methods shown in FIGS. 4 and 5 are implemented in a machine readable medium comprising machine readable instructions for causing a computer to perform the method. Such machine readable medium may include software modules and computer programs. The computer programs comprise multiple modules or objects to perform the methods, or the functions of the modules in the In-Vehicle Information System of FIG. 2A. The type of computer programming languages used to write the code may vary from procedural code type languages to object oriented languages. The files or objects need not have a one to one correspondence to the modules or method acts described depending on the desires of the programmer. Further, the method and apparatus may comprise combinations of software, hardware and firmware as is well known to those skilled in the art. Describing the methods by reference to flowcharts enables one skilled in the art to develop such programs including such instructions to carry out the methods on suitable computerized systems.

FIG. 4 is a flow chart of the process to manage information available to a driver according to one embodiment of the In-Vehicle Information System. As shown in FIG. 4, data is received from any of a variety of sources (block 402) including in-vehicle sources, off-vehicle sources and user inputs. The data received is standardized by converting it to a format recognizable by the In-Vehicle Information System and then stored for later use by the system (block 404). The data is presented to a driver according to predefined rules (block 406).

FIG. 5 is a flow chart of the process of presenting information to a driver or a passenger. The data available to the system and the data currently displayed on a screen are tracked (block 502). The current data and the current screen displayed are checked against trigger conditions to determine if the current screen should be redrawn (block 504). The screen display is redrawn (block 506) with updated or different data when the trigger conditions indicate that the screen is to be redrawn.

Trigger conditions are set to warn the driver of abnormal or potentially dangerous conditions that occur in the vehicle. In an example embodiment, the screen displays gauges for vehicle information such as temperature, oil pressure and tire pressure. If the associated levels are within acceptable ranges, then the gauges displaying such levels may be replaced with other information as desired by the driver. For example, the driver may choose to replace the gauges on the display with an electronic address book or phone book. However, if during operation of the vehicle the data used for a gauge that is not being displayed falls out of a normal operating range (such as a dramatic increase in temperature), then the display is automatically redrawn to alert the driver of the condition and to display the particular gauge.

Trigger conditions are also set to prevent dangerous uses of the information available to the driver. In an example embodiment, when a trigger condition detects that the vehicle is in motion, access is prohibited to applications that are complex to operate and may distract the driver. For example, a driver is prevented from using the in-vehicle browser while driving.

In addition, trigger conditions can be set for preferences of different drivers of the vehicle. In an example embodiment, personal preferences can be set for vehicle settings such as mirror position and driver seat position. Personal preferences can also be set for the colors, fonts, configurations, languages and the like used by the display.

Alternate embodiments having additional or differing combinations of trigger conditions or predefined rules of priority will be readily apparent to one of skill in the art and are contemplated as within the scope of the invention.

Figure 6:
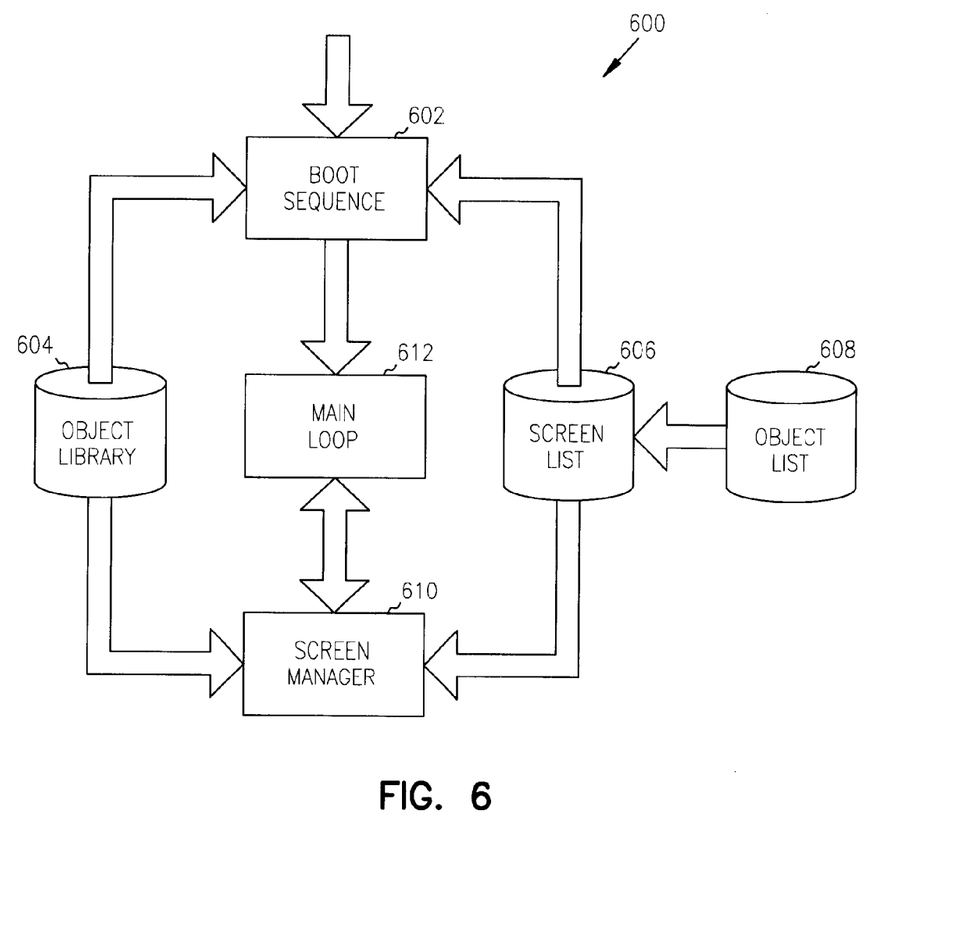
FIG. 6 is a block diagram of one embodiment of the core logic for the system architecture of FIG. 3.

Diversified Software, Inc. Implementation. This section describes a particular implementation of the core logic that is part of a product available from Diversified Software, Inc (DSI) who is the assignee of the present invention. The core logic controls the In-Vehicle Information System. FIG. 6 is a block diagram of an example embodiment of the core logic portion of the system architecture shown in FIG. 3. As shown in FIG. 6, the DSI implementation of the core logic 600 comprises the following program modules: boot sequence 602, object library 604, screen list 606, object list 608, screen manager 610, and main loop 612.

The boot sequence 602 performs any required board initializations. The boot sequence 602 is called once at the startup of the In-Vehicle Information System. Depending on the desired display output during initialization, the screen list 606 and the object library 604 may be required by the boot sequence 602.

The object library 604 includes compiled code for all the objects supported by the core logic 600. The screen list 606 is a segment of memory in the In-Vehicle Information System's flash ROM. The screen list 606 contains information for drawing any screen used by the In-Vehicle Information System. This information includes the objects that compose a screen as well as the trigger conditions indicating when to switch to another screen. The object list 608 is another section of memory in the In-Vehicle Information System's flash ROM. It contains the information used to draw any object used by the system. Each object may be used by any number of screens in the screen list 606.

The screen manager 610 consists of the computer-executable instructions used to manage the objects to be drawn to the screen. The screen manager 610 has four different functions: screen initialization, execution, trigger checks, and screen destroy. As part of the screen initialization function, when a new screen is to be drawn, the screen manager 610 dynamically creates in a memory the objects needed by the screen. Any object that is to be drawn consistently to the screen (i.e., a background object) will be drawn during initialization. The initialization function is responsible for setting everything to a known state, including any appropriate values in the data store. As part of the execution function, every time the screen is redrawn to the display, the screen manager 610 cycles through the list of screen objects and calls a draw function of each one. The execution function is responsible for clearing the screen, copying the background image to the screen, and drawing all dynamic objects to the screen as appropriate. The trigger checks function is used to check all appropriate triggers for a screen and to determine if a new screen is to be drawn the next time the display refreshes. As part of the trigger checks function, the screen manager 610 performs the required checks of data from the data store and indicates if a new screen must be drawn. As part of the screen destroy function, when a new screen is requested, the old screen is responsible for destroying itself. The screen manager 610 ensures that all dynamic objects created by the screen are destroyed, freeing memory for the next new screen.

The main loop 612 enacts the screen manager 610. This may be implemented in a timer-driven, interrupt fashion or as an infinite loop. The main loop 612 keeps track of the current screen, calling the execution function of the main loop 612 each time the screen redraws. As needed, the main loop 612 checks for triggers through the screen manager 610, and if necessary, destroys the current screen and creates a new one. The main loop 612 is also responsible for switching between a normal execution mode and a system maintenance mode.

The system maintenance mode allows a user to obtain vehicle operating information and check the current status of various vehicle components. In an example embodiment, a user enters the system maintenance mode to check average engine performance parameters such as average oil pressure or average engine temperature or driving miles/hours since last oil change. Utilizing triggering conditions as previously described, the In-Vehicle Information System may notify the driver of maintenance that is due to be completed It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An information system for a vehicle, the information system
    integrating information from multiple sources on a single in-vehicle display, the information system comprising:
    a display located in the line of sight of an operator of the vehicle, the display presenting information to an operator; and
    computer executable instructions for receiving information from a plurality of sources and for selectively presenting the information to the operator on the display wherein the information presented to the operator at a particular time depends on one or more predefined trigger conditions to prevent dangerous uses.

2. The information system of claim 1, wherein the display is located in a dashboard of the vehicle in place of an instrument cluster.

3. The information system of claim 1, wherein information presented on the display comprises dynamic objects associated with one or more of the multiple sources and wherein the dynamic objects presented at a particular time are interchangeable.

4. The information system of claim 1, wherein at least one of the plurality of sources is an in-vehicle system.

5. The information system of claim 1, wherein at least one of the plurality of sources is an off-vehicle system.

6. The information system for the vehicle of claim 1, wherein at least one of the plurality of sources is a user interface presented on the display.

7. The information system for the vehicle of claim 6, further comprising multi-function programmable switches operatively connected to the user interface for selecting information.

8. The information system for the vehicle of claim 1, further comprising an additional programmable display for presenting information to a non-operator of the vehicle.

9. A method of managing information available to an operator of a vehicle from a variety of sources, the method comprising:
    initializing at least one new screen by dynamically creating the at least one new screen and displaying the at least one new screen on a display device;
    receiving data from at least one of the sources;
    standardizing the data to a predetermined format;
    filtering the data so that only the data used by a current configuration of a display system will be retained;
    storing the data in a data store; and
    selectively displaying the data on the display device in the vehicle based on one or more predefined trigger conditions, wherein at least one old screen is capable of destroying itself to free memory.

10. A method of managing information according to claim 9, where the acts are performed in the order recited.

11. A computer readable medium having instructions stored thereon for causing a computer to perform a method of presenting information from multiple applications on a dynamic in-vehicle display, the method comprising:
    upon a maintenance triggering condition, receiving maintenance data from one of the multiple applications;
    prioritizing the maintenance data to determine if a new screen is to be presented on the display;
    switching between a normal execution mode and a system maintenance mode; and
    updating a current screen presented on the display when at least one maintenance triggering condition indicates to do so.

12. The computer readable medium of claim 11, wherein the act of prioritizing the data further comprises tracking the current screen and determining if a maintenance triggering condition is met.

13. The method as recited in claim 11, wherein the maintenance triggering condition is user-defined.

14. The method as recited in claim 11, wherein the maintenance triggering condition is based on the maintenance data.

15. An intelligent vehicle system comprising:
    an in-vehicle information system for receiving information from a plurality of sources, integrating the information, and dynamically displaying the information to a driver based on one or more predefined trigger conditions, wherein the trigger conditions include trigger conditions to prevent dangerous uses; and
    a server for providing information to the in-vehicle information system.

16. The intelligent vehicle system of claim 15, wherein the server provides information for a particular geographic region.

17. The intelligent vehicle system of claim 15, wherein the server provides information to the in-vehicle information system in response to a request from the in-vehicle information system.

18. The intelligent vehicle system of claim 15, wherein the server broadcasts information to the in-vehicle information system.

19. A vehicle comprising:
    an in-vehicle information system for receiving information from a plurality of sources and selectively displaying the information to a driver based on one or more predefined trigger conditions to prevent dangerous uses, wherein the information from the plurality of sources is displayed on a centrally located display; and
    an in-vehicle browser for presenting information to the driver and receiving requests from the driver.

20. The vehicle as recited in claim 19, wherein one of the predefined trigger conditions operates to prevent the driver from using the in-vehicle browser while driving.

21. A computerized method of presenting information from multiple applications on a dynamic in-vehicle display, the method comprising:
    receiving data from one of the multiple applications;
    prioritizing the data to determine if a new screen is to be presented on the display;
    if the new screen is needed, initializing the new screen by dynamically creating the new screen and displaying the new screen on a display device, wherein an old screen is capable of destroying itself to free memory; and
    updating a current screen presented on the display when at least one triggering condition indicates to do so.

22. The method of presenting information as claimed in claim 21, wherein the act of prioritizing the data further comprises tracking the current screen and determining if a triggering condition is met.

23. An integrated information system for a vehicle, the integrated information system comprising:
- a display located in the vehicle, the display presenting information to a user according to personal preferences; and
- a computer readable medium having computer executable instructions stored thereon, the computer executable instructions for receiving information from a plurality of sources and for selectively presenting the information to the user on the display wherein the information presented to the user at a particular time depends on one or more predefined trigger conditions, including trigger conditions for personal preferences.

24. The integrated information system of claim 23, wherein at least one of the plurality of sources is a voice recognition system.

25. The integrated information system of claim 23, wherein at least one of the plurality of sources is an input device selected from the group consisting of a button, a switch, a knob, a dial, a mouse, a touch pad, and a touch screen display.

26. The integrated information system of claim 23, wherein the user is a passenger in the vehicle.

27. The integrated information system of claim 23, wherein the user is an operator of the vehicle.

28. The integrated information system of claim 27, further comprising one or more additional displays for use by a passenger in the vehicle.

29. The integrated information system of claim 28, wherein the one or more additional displays provide information from at least one of the plurality of sources selected from the group consisting of a satellite TV system, a keyboard, a video game, a video cassette recorder and a digital video disk.

30. The information system as recited in claim 23, wherein the plurality of personal preferences include settings for driver seat position.

31. The information system as recited in claim 23, wherein the plurality of personal preferences include settings for mirror position.

32. The information system as recited in claim 23, wherein the plurality of personal preferences include display settings for the display.

33. An information system for a vehicle, the information system integrating information from multiple sources on a single in-vehicle display, the information system comprising:
- a display located in the line of sight of an operator of the vehicle, the display presenting information to the operator, the information comprising graphics that are dynamic in appearance and are received from one or more of a plurality of sources; and
- computer executable instructions for receiving information from the plurality of sources and for selectively presenting the information to the operator on the display wherein the information presented to the operator at a particular time depends on one or more predefined trigger conditions to prevent dangerous uses.

* * * * *